April 13, 1937. S. A. SNELL 2,077,279
LEVER CONSTRUCTION
Filed Feb. 1, 1933 2 Sheets-Sheet 1
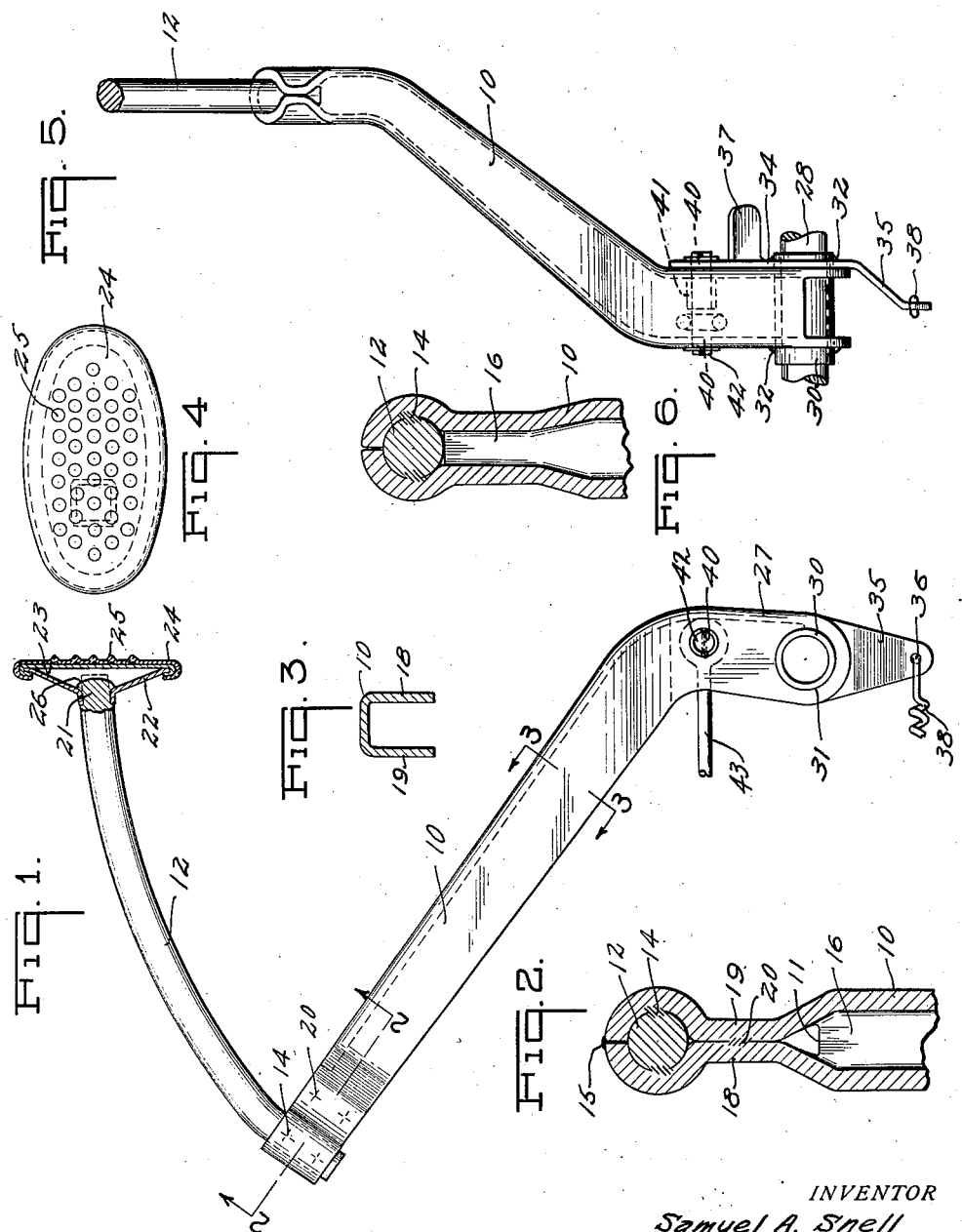
INVENTOR
Samuel A. Snell
BY Braselton, Whitcomb & Davies
ATTORNEYS April 13, 1937.  S. A. SNELL  2,077,279
LEVER CONSTRUCTION
Filed Feb. 1, 1933  2 Sheets-Sheet 2
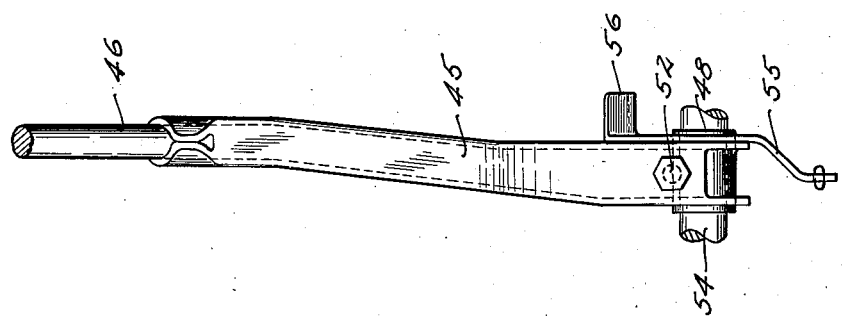
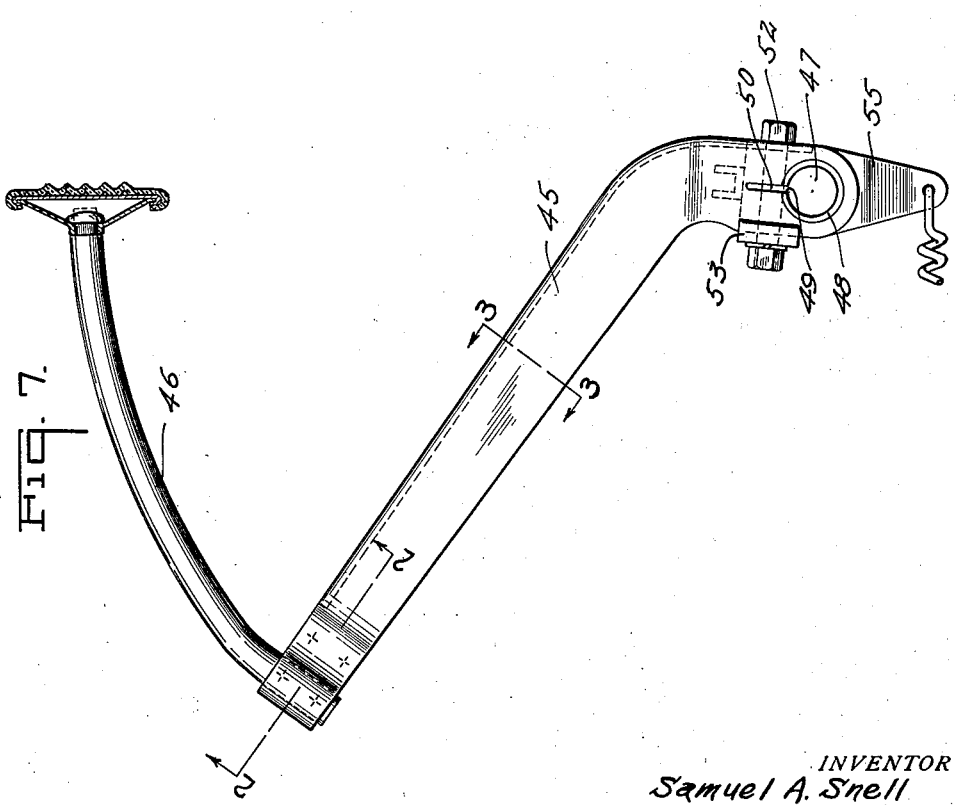
INVENTOR
Samuel A. Snell
BY Braselton, Whitcomb & Davis
ATTORNEYS.

Patented Apr. 13, 1937

2,077,279

UNITED STATES PATENT OFFICE 2,077,279

LEVER CONSTRUCTION

Samuel A. Snell, Toledo, Ohio, assignor to Nagole, Inc., Toledo, Ohio, a corporation of Ohio Application February 1, 1933, Serial No. 654,689

8 Claims. (Cl. 74—560)

This invention relates to lever constructions and more particularly to foot operated members or pedals for use in controlling various mechanisms of vehicles.

The invention contemplates structures of this character wherein the major portion thereof may be stamped and formed of sheet material, as for example, sheet steel to form a rigid construction, the elements of the structure being formed into substantially a unitary arrangement as by welding or other suitable means.

The invention has for an object the provision of a pedal wherein portions thereof may be formed of channel members, producing a structure having great strength and enhancing the rigidity of the construction to resist bending stresses and at the same time substantially reducing the weight and cost of an article of this character.

Another object of the invention is the provision of a pedal structure wherein machining operations are reduced to a minimum and wherein the structures are of such uniformity that the parts are readily interchangeable.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of one form of lever or pedal construction of the invention;

Figure 2 is a detail sectional view taken substantially on a line 2—2 of Figure 1;

Figure 3 is a detail sectional view taken substantially on a line 3—3 of Figure 1;

Figure 4 is a front view of the foot pad shown in Figure 1;

Figure 5 is an end elevational view of the lever shown in Figure 1;

Figure 6 is a detail view showing a modified arrangement of certain elements of the invention;

Figure 7 is a side elevational view similar to Figure 1 showing another form of pedal construction particularly adapted as a clutch control means for an automotive vehicle;

Figure 8 is an end elevational view of the lever shown in Figure 7.

While I have illustrated the device of my invention as particularly fabricated for use as a control means for brake or clutch mechanisms of an automotive vehicle, it is to be understood that I do not wish to limit my invention to such use, but that I contemplate its incorporation in any structure wherein the same may have utility.

Referring to the drawings in detail, I have illustrated in Figures 1 to 5 one form of lever or pedal preferably for use as a brake operating or control member. This form consists of a portion 10 which is preferably of channel formation of a cross-section as illustrated in Figure 3. The forwardly extending portion or member 12 is preferably of solid construction, such as a metal bar or rod suitably formed to desirable contour, although this element may be of tubular or other suitable formation without departing from the spirit of the invention. This member is secured to one end of the portion 10 by wrapping the extremities of the substantially parallel walls of the channelled upright 10 around the end of the member 12 and securing the elements together as at 14 preferably by welding. If desirable, the juxtaposed ends of the channel walls may be welded as at 15 to further strengthen the joint between members 10 and 12, but this is not essential to the successful fabrication of the arrangement. The web 16 of the channelled member 10 terminates as at 11, so that the channel walls 18 and 19 may be brought or pressed together and preferably welded together as at 20, as illustrated in Figure 2.

The forward end of the pedal extremity 12 is provided with a reduced portion or tenon 21 preferably of square or polygonal formation to which is secured a sheet metal bracket 22, in the embodiment shown its peripheral portions being of substantially oval configuration. After the bracket 22 is assembled upon the tenon 21, the projecting metal of the tenon may be swaged over as at 26, thus securely holding the bracket to the member 12. Secured to the bracket 22 is a plate member or foot pad 23 having its edges flanged over the periphery of the bracket 22, in this manner the foot pad being securely held to the bracket to form a rigid construction. If desired, a cover pad 24 of composition material such as rubber, having a plurality of projections 25 serving to prevent the operator's foot from slipping, may be secured to the metal pad 23, as particularly illustrated in Figure 1. The cover pad 24 may however be dispensed with, and projections may be formed directly on the surface of the metal pad 23 to serve as a foot pad.

The lower extremity 27 of the channel member 10 is provided with a bearing construction so that the pedal may be mounted upon a suitable support or cross shaft 28. The bearing construction illustrated consists of a bushing 30 snugly received in openings 31 in the member 10, and is preferably welded in position as at 32.

Suitably secured to the extremity of the member 10 is a member 34 having a downwardly extending portion 35 provided with an opening 36 for the reception of the end of a pedal return spring or pull back 38. The member 34 may be provided with an outwardly extending projection or stop element 37 depending upon the use to which the pedal may be put for limiting certain movement of the pedal.

Openings 40 near the extremity of member 10 have been provided to receive suitable anchoring means such as pin 42, for an operating rod 43, a tubular spacer or bushing 41 being positioned adjacent one of the openings 40 and within the channel shaped member 10 to afford suitable additional bearing surface for such operating rod anchor.

Figures 7 and 8 illustrate a modified form of pedal or lever construction particularly adapted as a clutch control member. In this form of the invention, the body or channel member 45 is substantially similar to the member 10 hereinbefore described. The member 45 is formed by folding a flat sheet of material into channel shape having an end portion wrapped around a pedal extension 46 in the manner previously described in connection with the form illustrated in Figure 1. The side walls of the lower end of member 45 are bored as at 47 to accommodate a cylindrical bearing bushing 48 having a longitudinal slot 49 therein preferably positioned in registration with the slots 50 in the side walls of the member 45 and adjacent to the bores 47. Positioned substantially at right angles with respect to the bushing 48 is a clamping screw 52, a plate 53 being provided across the open side of the channel member 45, the plate having an opening to receive the clamping screw 52, which screw is adapted to adjustably secure the pedal structure to a cross shaft or other support 54.

A combined pull back and stop member 55 similar to the member 34 previously described is preferably welded to a side wall of the member 45, the stop element 56 for limiting the movement of the pedal extending laterally therefrom as particularly illustrated in Figure 8.

It is apparent that, within the scope of the invention, modifications and different arrangements may be made other than is herein disclosed, and the present disclosure is illustrative merely, the invention comprehending all variations thereof.

What I claim is:—

1. A pedal control member comprising in combination a channel shaped body portion, the side walls of said channel shaped member at one extremity being formed into substantially cylindrical configuration, the side walls of said channel member being welded together adjacent said cylindrical configuration; an angularly extending curved bar having a portion projecting into said cylindrical formation of the body member; said bar being welded to the channel member, the bar being formed with a tenon on one end thereof; a pad member mounted upon said tenon, a portion of the latter being swaged to hold said pad member in fixed relation on said bar.

2. A pedal control member comprising in combination a channel shaped body portion, the side walls of said channel member at one extremity being formed into substantially cylindrical configuration, the other extremity having aligned openings therein; an angularly extending curved bar having a portion projecting into said cylindrical formation of the body member; means for securing the bar to the channel member, said bar having a tenon on one end thereof; a pad member mounted upon said tenon, a portion of the latter being swaged to hold said pad member in fixed relation on said bar, said channel member having a bearing bushing extending into the aligned openings therein for mounting the member upon a support.

3. A pedal control member comprising in combination a channel shaped body portion, the side walls of said channel shaped member at one extremity being formed into substantially cylindrical configuration; an angularly extending arcuately shaped bar having a portion projecting into said cylindrical formation of the body member; means for securing the bar to the channel member, said bar having a tenon on one end thereof; a pad member mounted upon said tenon, a portion of the latter being swaged to hold said pad member in fixed relation on said bar; a combined stop and pull-back plate secured to one wall of the channel body member, and a bearing bushing extending through aligned openings in said channel member adjacent said plate for mounting said channel member upon a support.

4. A pedal control member comprising in combination a channel shaped body portion, the side walls of said channel shaped member at one extremity being formed into substantially cylindrical configuration; an angularly extending bar having a portion projecting into said cylindrical formation of the body member; means for securing the bar to the channel member, said bar having a tenon on one end thereof; a pad member mounted upon said tenon, a portion of the latter being swaged to hold said pad member in fixed relation on said bar; a split bearing bushing mounted in openings in the side walls of the channel member; and a clamping screw carried by said channel member adjacent said bearing bushing for clamping said bushing to a support.

5. A pedal control member comprising a channel shaped body portion formed of sheet metal and having openings in the side walls thereof adjacent one extremity; a bearing bushing extending through said openings; means for securing said bushing to said channel member; said channel member being formed at its other extremity with a substantially cylindrical configuration; a curved bar fitting in said cylindrical configuration and terminating in a foot pad; and means for securing said bar to said channel member.

6. A pedal control member comprising a channel shaped body portion formed of sheet metal and having openings in the side walls thereof adjacent one extremity; a bearing bushing extending through said openings and welded to the side walls of said channel member; the side walls of said channel member being formed at its other extremity into substantially cylindrical configuration; a curved bar fitting in said cylindrical configuration; and means for securing said bar to said channel member.

7. A foot operated control member comprising a channel shaped body portion formed of sheet metal; a forwardly extending bar of circular cross-section, the upper end of said channel shaped body member being of a cylindrical configuration to snugly receive said bar, said bar being welded to said channel member; said bar having a polygonally shaped portion formed at one end, and a foot pad secured to said polygonally shaped portion.

8. A pedal control member comprising a channel shaped body formed of sheet metal and having portions of its side walls formed to cylindrical configuration; a bar of substantially circular cross-section extending from said channel shaped member and secured in said cylindrical configuration, said bar having an end of polygonal formation; a foot pad carried by the polygonal formation of said bar; a portion of said bar being swaged to hold said pad member in fixed relation on the bar.

SAMUEL A. SNELL.